United States Patent
Kirillov

(10) Patent No.: US 11,796,820 B1
(45) Date of Patent: Oct. 24, 2023

(54) BINOCULAR DISPLAY LIGHT ENGINE WITH SINGLE MICROELECTROMECHANICAL SYSTEM (MEMS) MIRROR AND MULTIPLE LIGHT TRANSMITTERS

(71) Applicant: Infineon Technologies AG, Neubiberg (DE)

(72) Inventor: Boris Kirillov, Judendorf-Straßengel (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/048,721

(22) Filed: Oct. 21, 2022

(51) Int. Cl.
G02B 27/01 (2006.01)
G02B 27/00 (2006.01)
G02B 27/18 (2006.01)

(52) U.S. Cl.
CPC ..... *G02B 27/0172* (2013.01); *G02B 27/0031* (2013.01); *G02B 27/0176* (2013.01); *G02B 27/18* (2013.01); *G02B 2027/014* (2013.01); *G02B 2027/0136* (2013.01); *G02B 2027/0178* (2013.01)

(58) Field of Classification Search
USPC ............................................................ 345/8
See application file for complete search history.

(56) References Cited

U.S. PATENT DOCUMENTS

| | | | | |
|---|---|---|---|---|
| 2001/0050660 A1* | 12/2001 | Maeda | ............... | G02B 27/0172 345/8 |
| 2007/0109658 A1* | 5/2007 | Inoguchi | ............ | G02B 27/0172 359/631 |
| 2008/0151193 A1* | 6/2008 | Reder | ................. | G02B 30/23 359/464 |
| 2011/0128503 A1* | 6/2011 | Sawai | ................. | G03B 35/26 353/7 |
| 2012/0032875 A1* | 2/2012 | Sprowl | ............... | G02B 27/01 353/98 |
| 2019/0018246 A1* | 1/2019 | Kogure | ................ | C03C 3/064 |
| 2020/0150428 A1* | 5/2020 | Greenberg | ........ | G02B 26/101 |
| 2021/0227187 A1* | 7/2021 | Stanley | .............. | G02B 17/004 |
| 2022/0201264 A1* | 6/2022 | Kirillov | ............. | G06V 40/193 |
| 2022/0244535 A1* | 8/2022 | Kirillov | ............ | G02B 27/0172 |

FOREIGN PATENT DOCUMENTS

EP 1429171 A2 6/2004
EP 3428710 A1 1/2019

\* cited by examiner

*Primary Examiner* — Chineyere D Wills-Burns
(74) *Attorney, Agent, or Firm* — Harrity & Harrity, LLP

(57) ABSTRACT

An image projection system includes: eyeglasses including a frame, a first eyeglass lens, and a second eyeglass lens; and a binocular light engine coupled to the frame. The binocular light engine includes a first light transmitter configured to transmit a first plurality of light beams corresponding to a first stereoscopic image on a first transmission path; a second light transmitter configured to transmit a second plurality of light beams corresponding to a second stereoscopic image on a second transmission path; and a single scanning structure shared by the first transmission path and the second transmission path. The single scanning structure is configured to: rotate about two scanning axes, direct the first plurality of light beams at the first eyeglass lens according to a scanning pattern, and direct the second plurality of light beams at the second eyeglass lens according to the scanning pattern.

20 Claims, 3 Drawing Sheets

BINOCULAR DISPLAY LIGHT ENGINE WITH SINGLE MICROELECTROMECHANICAL SYSTEM (MEMS) MIRROR AND MULTIPLE LIGHT TRANSMITTERS

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real-world environment of a user with a computer-generated virtual environment. Thus, a user is presented with a completely digital environment. In particular, computer-generated stereo visuals entirely surround the user. In a VR simulated environment, a VR headset that provides 360-degree vision may be used.

A mixed reality (MR) experience combines elements of both AR and VR such that real-world and digital objects interact. Here, a real-world environment is blended with a virtual one.

These technologies, as well as others that enhance a user's senses, may be referred to as extended reality (XR) technologies.

SUMMARY

In some implementations, an image projection system includes eyeglasses including a frame, a first eyeglass lens, and a second eyeglass lens; and a binocular light engine coupled to the frame, wherein the binocular light engine includes: a first light transmitter configured to generate and transmit a first plurality of light beams on a first transmission path, wherein the first plurality of light beams corresponds to a first stereoscopic image; a second light transmitter configured to generate and transmit a second plurality of light beams on a second transmission path, wherein the second plurality of light beams corresponds to a second stereoscopic image; and a single scanning structure shared by the first transmission path and the second transmission path, wherein the single scanning structure is configured to: rotate about a first scanning axis for steering the first plurality of light beams and the second plurality of light beams in a first scanning direction, rotate about a second scanning axis for steering the first plurality of light beams and the second plurality of light beams in a second scanning direction, direct the first plurality of light beams at the first eyeglass lens according to a scanning pattern, and direct the second plurality of light beams at the second eyeglass lens according to the scanning pattern, wherein the first eyeglass lens is configured to receive the first plurality of light beams from the single scanning structure and project the first stereoscopic image into a first field of view based on the first plurality of light beams and the scanning pattern, and wherein the second eyeglass lens is configured to receive the second plurality of light beams from the single scanning structure and project the second stereoscopic image into a second field of view based on the second plurality of light beams and the scanning pattern.

In some implementations, an image projection system includes a first relay optics system configured to generate a first stereoscopic image in a first field of view; a second relay optics system configured to generate a second stereoscopic image in a second field of view; and a binocular light engine including: a first light transmitter configured to generate and transmit a first plurality of light beams on a first transmission path, wherein the first plurality of light beams correspond to the first stereoscopic image; a second light transmitter configured to generate and transmit a second plurality of light beams on a second transmission path, wherein the second plurality of light beams correspond to the second stereoscopic image; and a single scanning structure shared by the first transmission path and the second transmission path, wherein the single scanning structure is configured to: rotate about a first scanning axis for steering the first plurality of light beams and the second plurality of light beams in a first scanning direction, rotate about a second scanning axis for steering the first plurality of light beams and the second plurality of light beams in a second scanning direction, direct the first plurality of light beams at the first relay optics system according to a scanning pattern, and direct the second plurality of light beams at the second relay optics system according to the scanning pattern, wherein the first relay optics system is configured to receive the first plurality of light beams from the single scanning structure and project the first plurality of light beams into the first field of view based on the scanning pattern to generate the first stereoscopic image in the first field of view, and wherein the second relay optics system is configured to receive the second plurality of light beams from the single scanning structure and project the second plurality of light beams into the second field of view based on the scanning pattern to generate the second stereoscopic image in the second field of view.

In some implementations, a binocular method of simultaneously projecting a first stereoscopic image into a first eye of a user of an image projection system and a second stereoscopic image into a second eye of the user includes transmitting, by a first light transmitter of the image projection system, a first plurality of light beams on a first transmission path, wherein the first plurality of light beams correspond to the first stereoscopic image; transmitting, by a second light transmitter of the image projection system, a second plurality of light beams on a second transmission path, wherein the second plurality of light beams correspond to the second stereoscopic image; steering, by a single scanning structure of the image projection system, the first plurality of light beams according to a scanning pattern, wherein the single scanning structure is shared by the first transmission path and the second transmission path; steering, by the single scanning structure, the second plurality of light beams according to the scanning pattern; projecting, by a first relay optics system of the image projection system, the first plurality of light beams, while being steered according to the scanning pattern, into the first eye; and projecting, by a second relay optics system of the image projection system, the second plurality of light beams, while being steered according to the scanning pattern, into the second eye.

BRIEF DESCRIPTION OF THE DRAWINGS

Implementations are described herein making reference to the appended drawings.

DETAILED DESCRIPTION

Figure 1:
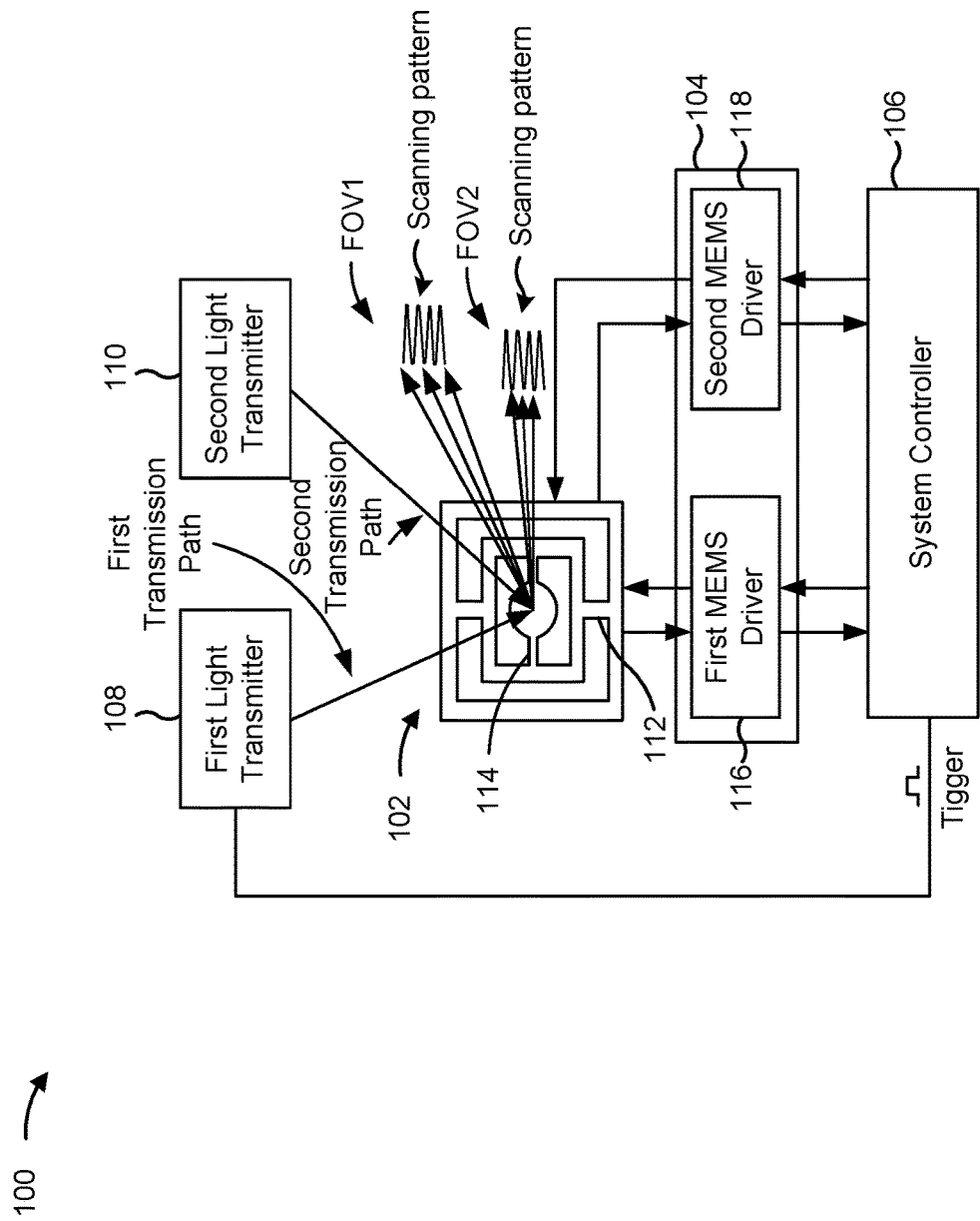
FIG. 1 shows a schematic block diagram of a two-dimensional (2D) scanning system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry or without departing from the aspects of the implementations described herein. For example, a resistor with an approximate resistance value may practically have a resistance within 5% of the approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Wearable headgear, such as eye-glasses and head-mounted displays (HMDs), be used in extended reality (XR) technologies. For example, augmented reality (AR) is a technology that augments physical environments on a mobile device screen by overlaying the physical environments with digital content. AR adds digital elements to a live view. For example, a captured piece of an environment is augmented with digital information that is superimposed thereon. Thus, digital content is overlaid onto the captured piece of the environment to visually provide additional information to a user. The digital content may be projected directly onto a user's retina, as is the case for virtual retinal displays. Virtual reality (VR) is a technology that entirely replaces the real-world environment of a user with a computer-generated virtual environment. Thus, a user is presented with a completely digital environment in which computer-generated stereo visuals surround the user. In a VR simulated environment, a VR headset that provides 360-degree vision may be used. A mixed reality (MR) experience combines elements of both AR and VR such that real-world and digital objects interact. Here, a real-world environment is blended with a virtual one. These technologies, as well as others that enhance a user's senses, may be referred to as XR technologies.

Binocular vision can be implemented in image projection systems and can be used in some XR technologies to project images into both eyes of the user. In some XR technologies, stereoscopic imaging may be used to create an illusion of depth by projecting two slightly offset images separately to each eye of the user. For example, the two slightly offset images (e.g., two stereoscopic images) may be of a same scene or a same object but with an illusion of being projected from slightly different angles or perspectives. Generating the two stereoscopic images should be performed in a synchronized manner in order for the user to properly perceive a coherent image having the illusion of depth. Synchronization between the two stereoscopic images can be difficult to achieve, due to a number of components that require synchronization. As a result, synchronization requirements can add complexity to the image projection system, which can lead to higher costs. In addition, the synchronization requirements can place limitations on the stereoscopic image. For example, it may be more difficult to synchronize the two stereoscopic images over larger scanning areas. Therefore, the synchronization requirements may limit a size of the stereoscopic image, which can limit the user's experience.

In addition, an image projection system that provides binocular vision may be comprised of components that are duplicated for each eye. For example, separate scanners, light sources, drivers, and processing components may be provided in duplicate in such image projection systems. Duplication of the components can increase manufacturing costs and can make it more difficult to achieve synchronization. In addition, the duplication of the components can increase a power consumption of the image projection system due to a need to operate more components and due to a need for higher processing power to achieve synchronization between the components. Duplication of the components can also increase the system size which is typically desired to be minimized in any wearable application.

When the image projection system is implemented in wearable headgear that uses an integrated power supply, such as an integrated battery, limiting the power consumption becomes important for extending an amount of time the wearable headgear can be operated. Meanwhile, the power consumption is further related to (e.g., proportional to) image brightness, which should be maintained high enough to enable the wearable headgear to be used for outdoor applications.

Some implementations disclosed herein are directed to an image projection system that produces binocular images, such as stereoscopic images, with a reduced number of components that may reduce manufacturing costs, reduce system size, relax synchronization requirements, and/or reduce power consumption. For example, the image projection system may include a single scanning structure that is used to project images into both eyes of a user. The single scanning structure may be used to generate one scanning pattern that is used to project the images into both eyes of the user and which can be synchronized with two light transmitters to generate two separate images. In some implementations, the two light transmitters are individually driven by a single display controller according to display content. Accordingly, a number or components and an amount of power consumed by the image projection system can be reduced, resulting in lower costs and longer operation times. In addition, reducing the power consumption may enhance a mobility of the image projection system by enabling longer operation times before charging the integrated power supply. In addition, reducing the power consumption may enable a size of the integrated power supply to be reduced, which may further reduce costs. In addition, reducing the power consumption may enable the image projection system to maintain image brightness at a sufficient level to enable the wearable headgear to be used for outdoor applications or to enable the wearable headgear to be used for outdoor applications for longer durations.

FIG. 1 shows a schematic block diagram of a 2D scanning system 100 according to one or more implementations. In particular, the 2D scanning system 100 includes a microelectromechanical system (MEMS) mirror 102 implemented as a single scanning structure that is configured to steer or otherwise deflect light beams according to a 2D scanning pattern. The 2D scanning system 100 further includes a MEMS driver system 104, a system controller 106, a first light transmitter 108, and a second light transmitter 110.

In the example shown in FIG. 1, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 112 that enables the MEMS mirror 102 to steer light in a first scanning direction (e.g., an x-direction) and a second scanning axis 114 that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field of view. The scan, such as an oscillating horizontal scan (e.g., from left to right and right to left of a field of view), an oscillating vertical scan (e.g., from bottom to top and top to bottom of a field of view), or a combination thereof (e.g., a Lissajous scan or a raster scan), can illuminate the field of view in a continuous scan fashion. By emitting successive light beams in different scanning directions, an image can be projected into the field of view, as is the case in XR technologies. In other words, the field of view can be illuminated by a scanning operation. In general, an entire field of view represents a scanning area defined by a full range of motion of the MEMS mirror 102 at which the MEMS mirror 102 is driven. Thus, the entire field of view is delineated by a left edge, a right edge, a bottom edge, and a top edge. The entire field of view can also be referred to as a field of illumination or as a projection area in a projection plane onto which an image is projected.

The MEMS mirror 102 can direct a particular light beam at a desired 2D coordinate (e.g., an x-y coordinate) in the field of view. The desired 2D coordinate may correspond to an image pixel of a projected image, with different 2D coordinates corresponding to different image pixels of the projected image. Accordingly, multiple light beams transmitted at different transmission times can be steered by the MEMS mirror 102 at the different 2D coordinates of the field of view in accordance with the 2D scanning pattern. The MEMS mirror 102 can be used to scan the field of view in both scanning directions by changing an angle of deflection of the MEMS mirror 102 on each of the first scanning axis 112 and the second scanning axis 114.

A rotation of the MEMS mirror 102 on the first scanning axis 112 may be performed between two predetermined extremum deflection angles (e.g., +1-5 degrees, +1-15 degrees, etc.). Likewise, a rotation of the MEMS mirror 102 on the second scanning axis 114 may be performed between two predetermined extremum deflection angles (e.g., +1-5 degrees, +1-15 degrees, etc.). In some implementations, depending on the 2D scanning pattern, the two predetermined extremum deflection angles used for the first scanning axis 112 may be the same as the two predetermined extremum deflection angles used for the second scanning axis 114. In some implementations, depending on the 2D scanning pattern, the two predetermined extremum deflection angles used for the first scanning axis 112 may be different from the two predetermined extremum deflection angles used for the second scanning axis 114.

In some implementations, the MEMS mirror 102 can be a resonator (e.g., a resonant MEMS mirror) configured to oscillate side-to-side about the first scanning axis 112 at a first frequency (e.g., a first resonance frequency) and configured to oscillate side-to-side about the second scanning axis 114 at a second frequency (e.g., a second resonance frequency). Thus, the MEMS mirror 102 can be continuously driven about the first scanning axis 112 and the second scanning axis 114 to perform a continuous scanning operation. As a result, light beams reflected by the MEMS mirror 102 are scanned into the field of view in accordance with the 2D scanning pattern.

Different frequencies or a same frequency may be used for the first scanning axis 112 and the second scanning axis 114 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning and the raster scanning, synchronization of the two scanning axes is performed by the system controller 106 in conjunction with transmitting timings of the first light transmitter 108 and the second light transmitter 110.

For each respective scanning axis, including the first scanning axis 112 and the second scanning axis 114, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages resulting in an oscillating driving force. The oscillating driving force causes the MEMS mirror 102 to oscillate back and forth on the respective scanning axis between two extrema. Depending on the configuration, this actuation can be regulated or adjusted by adjusting the drive voltage off time, a voltage level of the drive voltage, or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field and an alternating electric current through conductive paths may create the oscillating torque around the scanning axis. Piezoelectric actuators may be integrated in leaf springs of the MEMS mirror 102 or the leaf springs may be made of piezoelectric material to produce alternating beam bending forces in response to an electrical signal and generate the oscillation torque.

The MEMS driver system 104 is configured to generate driving signals (e.g., actuation signals) to drive the MEMS mirror 102 about the first scanning axis 112 and the second scanning axis 114. In particular, the MEMS driver system 104 is configured to apply the driving signals to the actuator structure of the MEMS mirror 102. In some implementations, the MEMS driver system 104 includes a first MEMS driver 116 configured to drive the MEMS mirror 102 about the first scanning axis 112 and a second MEMS driver 118 configured to drive the MEMS mirror 102 about the second scanning axis 114. The first MEMS driver 116 may be configured to sense a first rotational position of the MEMS mirror 102 about the first scanning axis 112 and provide first position information indicative of the first rotational position (e.g., tilt angle or degree of rotation about the first scanning axis 112) to the system controller 106. Similarly, the second MEMS driver 118 may be configured to sense a second rotational position of the MEMS mirror 102 about the second scanning axis 114 and provide second position information indicative of the second rotational position (e.g., tilt angle or degree of rotation about the second scanning axis 114) to the system controller 106.

The system controller 106 may use the first position information and the second position information to trigger light beams at the first light transmitter 108 and the second light transmitter 110. For example, the system controller 106 may use the first position information and the second position information to set a transmission time of first light transmitter 108 and the second light transmitter 110 in order to target a particular 2D coordinate of the 2D scanning pattern of the MEMS mirror 102. Thus, a higher accuracy in position sensing of the MEMS mirror 102 by the first MEMS driver 116 and the second MEMS driver 118 may result in the system controller 106 providing more accurate and precise control of other components of the 2D scanning system 100.

As noted above, the first MEMS driver 116 and the second MEMS driver 118 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 112 or the second scanning axis 114). The drive voltage can be switched or toggled between a high-voltage (HV) level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level and the LV level is set to zero, it can be said that the drive voltage is toggled on and off (HV on/off). The oscillating driving force causes the MEMS mirror 102 to oscillate back and forth on the first scanning axis 112 or the second scanning axis 114 between two extrema. The drive voltage may be a constant drive voltage, meaning that the drive voltage is the same voltage when actuated (e.g., toggled on) or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 112 and the second scanning axis 114. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 112 and the second scanning axis 114. The actuation of the MEMS mirror 102 about a particular scanning axis controls its range of motion and scanning rate about that particular scanning axis.

For example, to make a Lissajous scanning pattern reproduce itself periodically with a frame rate frequency, the first scanning axis 112 and the second scanning axis 114 are each driven at a target scanning frequency f1, f2, respectively, with a defined frequency ratio or defined frequency difference therebetween that forms a repeatable Lissajous pattern (frame) with a frame rate. A new frame begins each time the Lissajous scanning pattern restarts, which may occur when a phase difference between a mirror phase about the first scanning axis 112 and a mirror phase about the second scanning axis 114 is zero. The system controller 106 may synchronize the oscillations about the first scanning axis 112 and the second scanning axis 114 to ensure this defined frequency ratio or defined frequency difference is maintained based on the first position information and the second position information received from the first MEMS driver 116 and the second MEMS driver 118, respectively.

The 2D scanning system 100 includes two light transmitters, including the first light transmitter 108 and the second light transmitter 110. The first light transmitter 108 and the second light transmitter 110 may be red-green-blue (RGB) light transmitters having red (R), green (G), and blude (B) light sources configured to generate RGB light beams. For example, the first light transmitter 108 may include a first red laser diode or light emitting diode for generating a first red light beam, a first green laser diode or light emitting diode for generating a first green light beam, a first blue laser diode or light emitting diode for generating a first blue light beam, and first optical elements that combine the three colored light beams into an RGB light beam for output from the first light transmitter 108. Accordingly, the first light transmitter 108 is configured to transmit each RGB light beam on a first transmission path towards the MEMS mirror 102. Each RGB light beam may be generated as a light pulse and the first light transmitter 108 may sequentially transmit multiple RGB light beams as the MEMS mirror 102 changes its transmission direction in order to target different 2D coordinates. A transmission sequence of the multiple RGB light beams and a timing thereof may be implemented by the first light transmitter 108 according to a trigger signal received from the system controller 106.

Similarly, the second light transmitter 110 may include a second red laser diode or light emitting diode for generating a second red light beam, a second green laser diode or light emitting diode for generating a second green light beam, a second blue laser diode or light emitting diode for generating a second blue light beam, and second optical elements that combine the three colored light beams into an RGB light beam for output from the second light transmitter 110. Accordingly, the second light transmitter 110 is configured to transmit each RGB light beam on a second transmission path towards the MEMS mirror 102. Each RGB light beam may be generated as a light pulse and the second light transmitter 110 may sequentially transmit multiple RGB light beams as the MEMS mirror 102 changes its transmission direction in order to target different 2D coordinates. A transmission sequence of the multiple RGB light beams and a timing thereof may be implemented by the second light transmitter 110 according to a trigger signal received from the system controller 106.

It will be appreciated that, in some implementations, the system controller 106 may be configured to synchronize transmission times of the first light transmitter 108 with transmission times of the second light transmitter 110 such that the first light transmitter 108 and the second light transmitter 110 transmit RGB light beams simultaneously in order to generate stereoscopic images that, when projected simultaneously, create an illusion of depth.

It is to be noted that a particular RGB light beam may be made of a single color of light, a combination of two colors of light, or a combination of all three colors or light. For example, the system controller 106 may control which R, G, B light sources of a particular RGB light transmitter is triggered for a light transmission, including some or all of the R, G, B light sources. While some of the R, G, B light sources may remain inactive during a light transmission, an output light beam may still be referred to as an RGB light beam (e.g., despite not including all three colors of light). Alternatively, an "RGB light beam" may be referred to as a "pixel light beam" that includes one or more colors of light depending on the desired pixel color to be projected into a corresponding field of view. Thus, the terms "RGB light beam" and "pixel light beam" can be used interchangeably.

The MEMS mirror 102 is shared by the first transmission path and the second transmission path such that the MEMS mirror 102 receives the RGB light beams generated by the first light transmitter 108 and receives the RGB light beams generated by the second light transmitter 110. Accordingly, the MEMS mirror 102 is configured to steer the RGB light beams from the first light transmitter 108 and the second light transmitter 110 in both in both scanning directions according to the 2D scanning pattern.

Using the MEMS mirror 102 as a single MEMS mirror that is used for steering both the RGB light beams generated by the first light transmitter 108 and the RGB light beams generated by the second light transmitter 110 saves power by reducing a number of components. In addition, using the MEMS mirror 102 as the single MEMS mirror reduces complexity of the 2D scanning system 100, which can relax synchronization requirements of the 2D scanning system 100 and improve synchronization between a stereoscopic image generated by the first light transmitter 108 and a stereoscopic image generated by the second light transmitter 110.

The MEMS mirror 102 is configured to project the RGB light beams received from the first light transmitter 108 into a first field of view FOV1 and project the RGB light beams received from the second light transmitter 110 into a second field of view FOV2. The RGB light beams from the first light transmitter 108 and the second light transmitter 110 are separated into two different field of views, the first field of view FOV1 and the second field of view FOV2. For example, the first light transmitter 108 and the second light transmitter 110 may be arranged with respect to the MEMS mirror 102 at unique angles or unique positions such that the RGB light beams from the first light transmitter 108 and the second light transmitter 110 are reflected by the MEMS mirror 102 into two different field of views, the first field of view FOV1 and the second field of view FOV2. However, because the MEMS mirror 102 is shared by first transmission path and the second transmission path, the RGB light beams from the first light transmitter 108 and the second light transmitter 110 follow the same 2D scanning pattern.

Using the MEMS mirror 102 as the single MEMS mirror ensures that the 2D scanning pattern used for steering the RGB light beams generated by the first light transmitter 108 is identical to the 2D scanning pattern used for steering the RGB light beams generated by the second light transmitter 110. Using an identical 2D scanning pattern for both eyes of a user, for example, can improve image perception and reduce or eliminate image blur which may otherwise occur if the scanning patterns are not matched. Moreover, eye fatigue, dizziness, and nausea, which can result when right eye images and left eye images are not synchronized can be avoided. As a result, the user's experience can be enhanced.

The system controller 106 is configured to control components of the 2D scanning system 100. In certain applications, the system controller 106 may also be configured to receive programming information with respect to the 2D scanning pattern and control a timing of the RGB light beams generated by the first light transmitter 108 and the second light transmitter 110 based on the programming information. Thus, the system controller 106 may include both processing and control circuitry that is configured to generate control signals for controlling the first light transmitter 108, the second light transmitter 110, the first MEMS driver 116, and the second MEMS driver 118.

In some implementations, the system controller 106 is configured to generate one or more trigger signals used to trigger the first light transmitter 108 and the second light transmitter 110 to generate the RGB light beams. As will be described in further detail, the system controller 106 is configured to synchronously (e.g., simultaneously) trigger the first light transmitter 108 and the second light transmitter 110 to generate synchronized RGB light beam transmissions in order to project stereoscopic images in the first field of view FOV1 and the second field of view FOV2. Thus, the first light transmitter 108 and the second light transmitter 110 are configured to simultaneously transmit respective RGB light beams at the MEMS mirror 102 to be projected into the first field of view FOV1 and the second field of view FOV2, respectively.

The system controller 106 is configured to set the driving frequencies of the MEMS mirror 102 for the first scanning axis 112 and the second scanning axis 114 and is capable of synchronizing the oscillations about the first scanning axis 112 and the second scanning axis 14 to generate the 2D scanning pattern. The system controller 106 can also control the transmission times of the RGB light beams of the first light transmitter 108 and the second light transmitter 110 to achieve a desired illumination pattern that produces the stereoscopic images. The desired illumination pattern is produced by a combination of the 2D scanning pattern produced by the MEMS mirror 102 and the transmission times triggered by the system controller 106. Because the RGB light beams generated by the first light transmitter 108 and the second light transmitter 110 follow the same 2D scanning pattern with synchronized transmission times, the 2D scanning system 100 is capable of projecting stereoscopic images into the first field of view FOV1 and the second field of view FOV2 with identical illumination patterns.

In some implementations, first field of view FOV1 may correspond to a first eye of the user and the second field of view FOV2 may correspond to a second eye of the user. In this case, using identical illumination patterns in both eyes of the user can improve image perception and reduce or eliminate image blur which may otherwise occur if the scanning patterns in both eyes are not matched. Moreover, eye fatigue, dizziness, and nausea, which can result when right eye images and left eye images are not synchronized can be avoided. As a result, the user's experience can be enhanced.

As indicated above, FIG. 1 is provided merely as an example. Other examples are possible and may differ from what was described with regard to FIG. 1. In practice, the 2D scanning system 100 may include additional components, fewer components, different components, or differently arranged components than those shown in FIG. 1 without deviating from the disclosure provided above. The 2D scanning system 100 may be implemented in various types of wearable headgear, including eyeglasses or HMDs, or may be implemented in other types of image projection systems that use two different field of views. Additionally, two or more components shown in FIG. 1 may be implemented within a single component, or a single component shown in FIG. 1 may be implemented as multiple, distributed components. Additionally, or alternatively, a set of components (e.g., one or more components) of the 2D scanning system 100 may perform one or more functions described as being performed by another set of components of the 2D scanning system 100.

Figure 2:
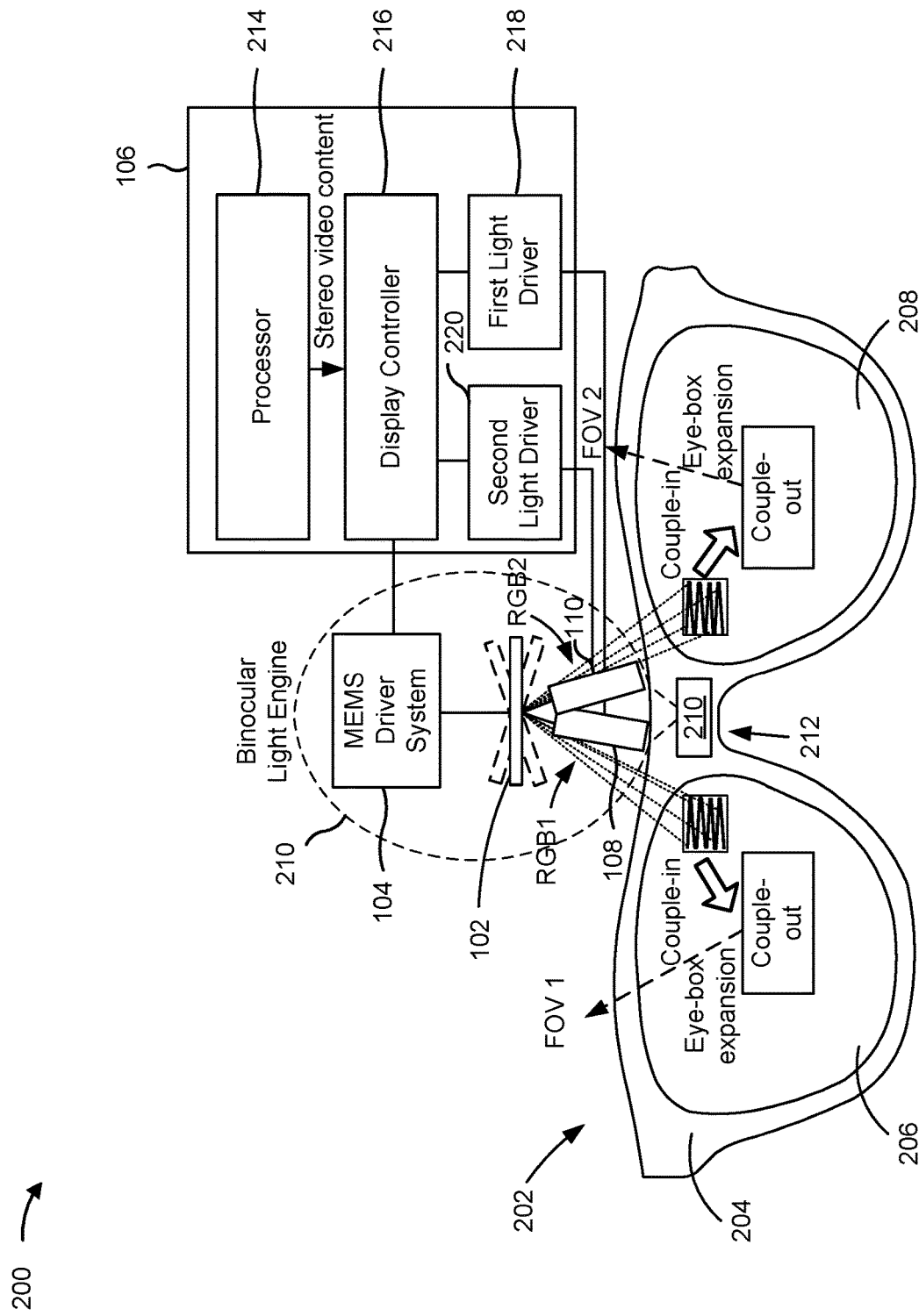
FIG. 2 shows an image projection system according to one or more implementations.

FIG. 2 shows an image projection system 200 according to one or more implementations. The image projection system 200 includes eyeglasses 202 that has a frame 204, a first relay optics system 206, and a second relay optics system 208. In some implementations, the first relay optics system 206 is a first eyeglass lens configured to be arranged in front of a first eye (e.g., a right eye) of a user and the second relay optics system 208 is a second eyeglass lens configured to be arranged in front of a second eye (e.g., a left eye) of the user. The image projection system 200 further includes a binocular light engine 210 that includes components of the 2D scanning system 100 of FIG. 1. The binocular light engine 210 is coupled to the frame 204 and includes the MEMS mirror 102, the MEMS driver system 104, the first light transmitter 108, and the second light transmitter 110. In some implementations, the binocular light engine 210 is integrated with a nose bridge 212 of the frame 204, which may provide a benefit of symmetry in light transmission distances to the first field of view FOV1 and the second field of view FOV2, thereby aiding in synchronization. In addition, image projection system 200 includes the system controller 106, that may be integrated with the binocular light engine 210 or may be coupled elsewhere on the frame 204.

The first light transmitter 108 is configured to generate and transmit a first plurality of light beams RGB1 on the first transmission path, where the first plurality of light beams RGB1 may correspond to a first stereoscopic image. The first light transmitter 108 may be configured to sequentially transmit the first plurality of light beams RGB1 at first transmission times. The second light transmitter 110 is configured to generate and transmit a second plurality of light beams RGB2 on the second transmission path, where the second plurality of light beams RGB2 may correspond to a second stereoscopic image that is synchronized with the first stereoscopic image. The second light transmitter 110 may be configured to sequentially transmit the second plurality of light beams RGB2 at second transmission times that are synchronized with the first transmission times by the system controller 106. The MEMS mirror 102, being arranged on the first transmission path and the second transmission path, is configured to simultaneously steer the first plurality of light beams RGB1 and the second plurality of light beams RGB2 according to a 2D scanning pattern produced by rotations (e.g., oscillations) about the first scanning axis 112 and the second scanning axis 114 discussed above in conjunction with FIG. 1. In addition, the MEMS mirror 102 is configured to direct the first plurality of light beams RGB1 at the first relay optics system 206 according to the 2D scanning pattern and direct the second plurality of light beams RGB2 at the second relay optics system 208 according to the 2D scanning pattern.

The first relay optics system 206 is configured to receive the first plurality of light beams RGB1 from the MEMS mirror 102 and project the first stereoscopic image into the first field of view FOV1 based on the first plurality of light beams RGB1 and the 2D scanning pattern. Similarly, the second relay optics system 208 is configured to receive the second plurality of light beams RGB2 from the MEMS mirror 102 and project the second stereoscopic image into the second field of view FOV2 based on the second plurality of light beams RGB2 and the 2D scanning pattern.

The first relay optics system 206 may include a first combiner structure (e.g., a glass substrate) that receives the first plurality of light beams RGB1 and projects (e.g., directs) the first plurality of light beams RGB1 onto the first eye (e.g., into the first field of view FOV1) according to a virtual projection plane that corresponds to virtual distance at which images are to be perceived. The first relay optics system 206 may include one or more waveguides that couple the first plurality of light beams RGB1 into the first relay optics system 206, perform eye-box expansion to expand beam widths of the first plurality of light beams RGB1 to increase a pixel size of projected image pixels that enables better perception by the first eye, and couple the first plurality of light beams RGB1 out from the first relay optics system 206 into the first field of view FOV1, towards the first eye. In other words, the first relay optics system 206 may transport (e.g., relay) light received from the MEMS mirror 102 to an output of the first relay optics system 206 at which the light is projected from the first relay optics system 206 into the first field of view FOV1.

Similarly, the second relay optics system 208 may include a second combiner structure (e.g., a glass substrate) that receives the second plurality of light beams RGB2 and projects (e.g., directs) the second plurality of light beams RGB2 onto the second eye (e.g., into the second field of view FOV2) according to a virtual projection plane that corresponds to virtual distance at which images are to be perceived. The second relay optics system 208 may include one or more waveguides that couple the second plurality of light beams RGB2 into the second relay optics system 208, perform eye-box expansion to expand beam widths of the second plurality of light beams RGB2 to increase a pixel size of projected image pixels that enables better perception by the second eye, and couple the second plurality of light beams RGB2 out from the second relay optics system 208 into the second field of view FOV2, towards the second eye. In other words, the second relay optics system 208 may transport (e.g., relay) light received from the MEMS mirror 102 to an output of the second relay optics system 108 at which the light is projected from the second relay optics system 208 into the second field of view FOV2.

In some implementations, the system controller 106 may include a processor 214, a display controller 216, a first light driver 218, and a second light driver 220. The processor 214 may be configured to provide stereo video content from an application that generates a video stream to the display controller 216. The display controller 216 may be configured to receive stereo video content, obtain first stereoscopic image data corresponding to the first stereoscopic image from the stereo video content, obtain second stereoscopic image data corresponding to the second stereoscopic image from the stereo video content, provide the first stereoscopic image data to the first light driver 218, and provide the second stereoscopic image data to the second light driver 220. The first light driver 218 may be configured to receive the first stereoscopic image data from the display controller 216 and drive the first light transmitter 108 according to the first stereoscopic image data to generate the first stereoscopic image. The first stereoscopic image data may include pixel information, including, for example, a pixel color, for each light beam of the first plurality of light beams RGB1. Similarly, the second light driver 220 may be configured to receive the second stereoscopic image data from the display controller 216 and drive the second light transmitter 110 according to the second stereoscopic image data to generate the second stereoscopic image. The second stereoscopic image data may include pixel information, including, for example, a pixel color, for each light beam of the second plurality of light beams RGB2. Accordingly, the first light transmitter 108 may be configured to generate the first plurality of light beams RGB1 according to a first plurality of pixel colors to produce the first stereoscopic image and the second light transmitter may be configured to generate the second plurality of light beams RGB2 according to a second plurality of pixel colors to produce the second stereoscopic image.

The display controller 216 ensures that the first stereoscopic image is synchronized with the second stereoscopic image on a frame-by-frame basis. In other words, the display controller 216 ensures that the first stereoscopic image and the second stereoscopic image are two offset images of a same image frame of the stereo video content. Additionally, the display controller 216 ensures that 2D coordinates that are sequentially illuminated in the first field of view FOV1 by the first plurality of light beams RGB1 are synchronized with 2D coordinates that are sequentially illuminated in the second field of view FOV2 by the second plurality of light beams RGB2. Meanwhile, the display controller 216 may also receive the first position information and the second position information from the MEMS driver system 104 and control the MEMS driver system 104, the first light driver 218, and the second light driver 220 to ensure that the 2D scanning pattern is synchronized with the first transmission times and the second transmission times.

In view of the above, using the MEMS mirror 102 as a single MEMS mirror that is used for steering both the first plurality of light beams RGB1 and the second plurality of light beams RGB2 saves power by reducing a number of components. In addition, using the MEMS mirror 102 as the single MEMS mirror reduces complexity of the image projection system 200, which can relax synchronization requirements of the image projection system 200 and improve synchronization between the first stereoscopic image generated by the first light driver 218 and the second stereoscopic image generated by the second light driver 220. In addition, using the MEMS mirror 102 as the single MEMS mirror ensures that the 2D scanning pattern used for steering the first plurality of light beams RGB1 is identical to the 2D scanning pattern used for steering the second plurality of light beams RGB2. Using an identical 2D scanning pattern for both eyes of a user, for example, can improve image perception and reduce or eliminate image blur which may otherwise occur if the scanning patterns in both eyes are not matched.

As indicated above, FIG. 2 is provided merely as an example. Other examples are possible and may differ from what was described with regard to FIG. 2. In practice, the image projection system 200 may include additional components, fewer components, different components, or differently arranged components than those shown in FIG. 2 without deviating from the disclosure provided above. Two or more components shown in FIG. 2 may be implemented within a single component, or a single component shown in FIG. 2 may be implemented as multiple, distributed components. Additionally, or alternatively, a set of components (e.g., one or more components) of the image projection system 200 may perform one or more functions described as being performed by another set of components of the image projection system 200.

Figure 3:
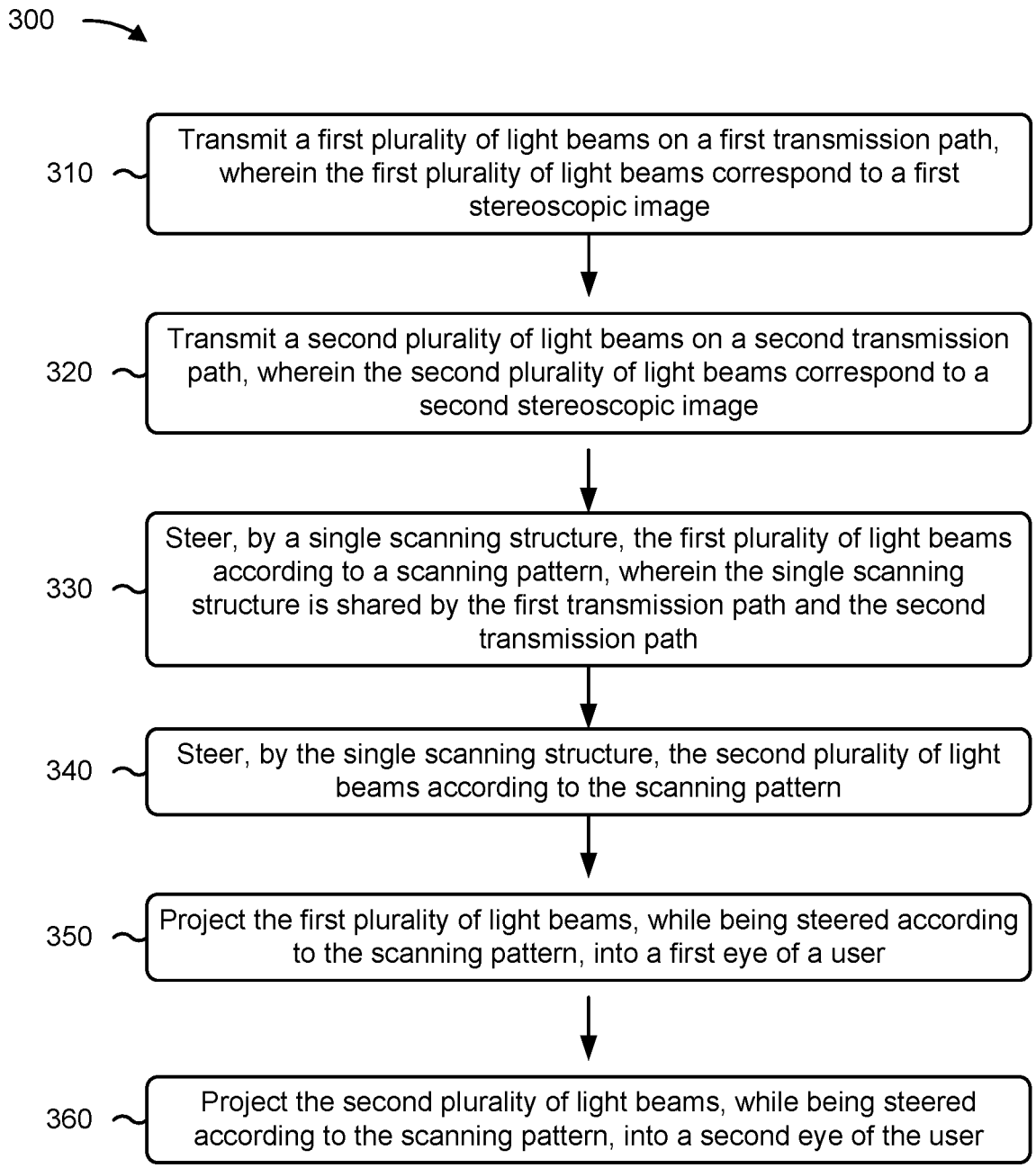
FIG. 3 shows a flowchart of an example process associated with an image projection system.

FIG. 3 is a flowchart of an example process 300 associated with an image projection system. In some implementations, one or more process blocks of FIG. 3 are performed by a first light transmitter of the image projection system (e.g., first light transmitter 108) or a second light transmitter of the image projection system (e.g., second light transmitter 110). Additionally, or alternatively, one or more process blocks of FIG. 3 may be performed by one or more components of the image projection system, such as a single scanning structure (e.g., MEMS mirror 102), a first relay optics system (e.g., first relay optics system 206), a second relay optics system (e.g., second relay optics system 208), and/or a controller (e.g., system controller 106). In some implementations, processes 300 may be directed to a binocular method of simultaneously projecting a first stereoscopic image into a first eye of a user and a second stereoscopic image into a second eye of the user.

As shown in FIG. 3, process 300 may include transmitting a first plurality of light beams on a first transmission path, wherein the first plurality of light beams correspond to a first stereoscopic image (block 310). For example, the first light transmitter 108 may transmit the first plurality of light beams on the first transmission path, wherein the first plurality of light beams correspond to the first stereoscopic image, as described above.

As further shown in FIG. 3, process 300 may include transmitting a second plurality of light beams on a second transmission path, wherein the second plurality of light beams correspond to a second stereoscopic image (block 320). For example, the second light transmitter 110 may transmit the second plurality of light beams on the second transmission path, wherein the second plurality of light beams correspond to the second stereoscopic image, as described above.

As further shown in FIG. 3, process 300 may include steering the first plurality of light beams according to a scanning pattern by a single scanning structure that is shared by the first transmission path and the second transmission path (block 330). For example, the MEMS mirror 102 may steer the first plurality of light beams according to the scanning pattern, wherein the MEMS mirror 102 is shared by the first transmission path and the second transmission path, as described above.

As further shown in FIG. 3, process 300 may include steering the second plurality of light beams according to the scanning pattern by the single scanning structure that is shared by the first transmission path and the second transmission path (block 340). For example, the MEMS mirror 102 may steer the second plurality of light beams according to the scanning pattern, as described above.

As further shown in FIG. 3, process 300 may include projecting the first plurality of light beams, while being steered according to the scanning pattern, into the first eye (block 350). For example, the first relay optics system 206 may project the first plurality of light beams, while being steered according to the scanning pattern, into the first eye, as described above.

As further shown in FIG. 3, process 300 may include projecting the second plurality of light beams, while being steered according to the scanning pattern, into the second eye (block 360). For example, the second relay optics system 208 may project the second plurality of light beams, while being steered according to the scanning pattern, into the second eye, as described above.

Process 300 may include additional implementations, such as any single implementation or any combination of implementations described in connection with one or more other processes described elsewhere herein.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

The following provides an overview of some Aspects of the present disclosure:

Aspect 1: An image projection system, comprising: eyeglasses comprising a frame, a first eyeglass lens, and a second eyeglass lens; and a binocular light engine coupled to the frame, wherein the binocular light engine comprises: a first light transmitter configured to generate and transmit a first plurality of light beams on a first transmission path, wherein the first plurality of light beams corresponds to a first stereoscopic image; a second light transmitter configured to generate and transmit a second plurality of light beams on a second transmission path, wherein the second plurality of light beams corresponds to a second stereoscopic image; and a single scanning structure shared by the first transmission path and the second transmission path, wherein the single scanning structure is configured to: rotate about a first scanning axis for steering the first plurality of light beams and the second plurality of light beams in a first scanning direction, rotate about a second scanning axis for steering the first plurality of light beams and the second plurality of light beams in a second scanning direction, direct the first plurality of light beams at the first eyeglass lens according to a scanning pattern, and direct the second plurality of light beams at the second eyeglass lens according to the scanning pattern, wherein the first eyeglass lens is configured to receive the first plurality of light beams from the single scanning structure and project the first stereoscopic image into a first field of view based on the first plurality of light beams and the scanning pattern, and wherein the second eyeglass lens is configured to receive the second plurality of light beams from the single scanning structure and project the second stereoscopic image into a second field of view based on the second plurality of light beams and the scanning pattern.

Aspect 2: The image projection system of Aspect 1, wherein the single scanning structure is a microelectromechanical system (MEMS) mirror.

Aspect 3: The image projection system of any of Aspects 1-2, wherein the first light transmitter is a first red-green-blue (RGB) light transmitter and the second light transmitter is a second RGB light transmitter.

Aspect 4: The image projection system of any of Aspects 1-3, wherein: the first light transmitter is configured to sequentially transmit light beams of the first plurality of light beams according to first transmission times, the second light transmitter is configured to sequentially transmit light beams of the second plurality of light beams according to second transmission times, and the first transmission times are synchronized with the second transmission times.

Aspect 5: The image projection system of Aspect 4, further comprising: a controller configured to synchronize the first transmission times and the second transmission times with the scanning pattern.

Aspect 6: The image projection system of any of Aspects 1-5, further comprising: a first light driver configured to receive first stereoscopic image data and drive the first light transmitter according to the first stereoscopic image data to generate the first stereoscopic image; and a second light driver configured to receive second stereoscopic image data and drive the second light transmitter according to the second stereoscopic image data to generate the second stereoscopic image.

Aspect 7: The image projection system of Aspect 6, further comprising: a controller configured to receive stereo video content, obtain the first stereoscopic image data and the second stereoscopic image data from the stereo video content, provide the first stereoscopic image data to the first light driver, and provide the second stereoscopic image data to the second light driver.

Aspect 8: The image projection system of Aspect 6, further comprising: a controller configured to control the first light driver, the second light driver, and the scanning pattern of the single scanning structure, wherein the first light driver is configured to drive the first light transmitter to sequentially transmit light beams of the first plurality of light beams according to first transmission times, wherein the second light driver is configured to drive the second light transmitter to sequentially transmit light beams of the second plurality of light beams according to second transmission times, and wherein the controller is configured to synchronize the first transmission times and the second transmission times with the scanning pattern. wherein the first light driver is configured to drive the first light transmitter to sequentially transmit light beams of the first plurality of light beams according to first transmission times, wherein the second light driver is configured to drive the second light transmitter to sequentially transmit light beams of the second plurality of light beams according to second transmission times, and wherein the controller is configured to synchronize the first transmission times and the second transmission times with the scanning pattern.

Aspect 9: The image projection system of Aspect 8, wherein the binocular light engine comprises the controller, the first light driver, and the second light driver.

Aspect 10: The image projection system of any of Aspects 1-9, the binocular light engine is integrated with a nose bridge of the frame.

Aspect 11: The image projection system of any of Aspects 1-10, wherein the scanning pattern is a Lissajous scanning pattern or a raster scanning pattern.

Aspect 12: An image projection system, comprising: a first relay optics system configured to generate a first stereoscopic image in a first field of view; a second relay optics system configured to generate a second stereoscopic image in a second field of view; and a binocular light engine comprising: a first light transmitter configured to generate and transmit a first plurality of light beams on a first transmission path, wherein the first plurality of light beams correspond to the first stereoscopic image; a second light transmitter configured to generate and transmit a second plurality of light beams on a second transmission path, wherein the second plurality of light beams correspond to the second stereoscopic image; and a single scanning structure shared by the first transmission path and the second transmission path, wherein the single scanning structure is configured to: rotate about a first scanning axis for steering the first plurality of light beams and the second plurality of light beams in a first scanning direction, rotate about a second scanning axis for steering the first plurality of light beams and the second plurality of light beams in a second scanning direction, direct the first plurality of light beams at the first relay optics system according to a scanning pattern, and direct the second plurality of light beams at the second relay optics system according to the scanning pattern, wherein the first relay optics system is configured to receive the first plurality of light beams from the single scanning structure and project the first plurality of light beams into the first field of view based on the scanning pattern to generate the first stereoscopic image in the first field of view, and wherein the second relay optics system is configured to receive the second plurality of light beams from the single scanning structure and project the second plurality of light beams into the second field of view based on the scanning pattern to generate the second stereoscopic image in the second field of view.

Aspect 13: The image projection system of Aspect 12, wherein a projection of the first stereoscopic image into the first field of view is synchronized with a projection of the second stereoscopic image into the second field of view.

Aspect 14: The image projection system of any of Aspects 12-13, wherein: the first light transmitter is a first red-green-blue (RGB) light transmitter configured to generate the first plurality of light beams according to a first plurality of pixel colors to produce the first stereoscopic image, and the second light transmitter is a second RGB light transmitter configured to generate the second plurality of light beams according to a second plurality of pixel colors to produce the second stereoscopic image.

Aspect 15: The image projection system of any of Aspects 12-14, wherein: the first light transmitter is configured to sequentially transmit light beams of the first plurality of light beams according to first transmission times, the second light transmitter is configured to sequentially transmit light beams of the second plurality of light beams according to second transmission times, and the first transmission times are synchronized with the second transmission times.

Aspect 16: The image projection system of any of Aspects 12-15, further comprising: a first light driver configured to receive first stereoscopic image data and drive the first light transmitter according to the first stereoscopic image data to generate the first stereoscopic image; and a second light driver configured to receive second stereoscopic image data and drive the second light transmitter according to the second stereoscopic image data to generate the second stereoscopic image.

Aspect 17: The image projection system of Aspect 16, further comprising: a controller configured to control the first light driver, the second light driver, and the scanning pattern of the single scanning structure, wherein the first light driver is configured to drive the first light transmitter to sequentially transmit light beams of the first plurality of light beams according to first transmission times, wherein the second light driver is configured to drive the second light transmitter to sequentially transmit light beams of the second plurality of light beams according to second transmission times, and wherein the controller is configured to synchronize the first transmission times and the second transmission times with the scanning pattern. wherein the first light driver is configured to drive the first light transmitter to sequentially transmit light beams of the first plurality of light beams according to first transmission times, wherein the second light driver is configured to drive the second light transmitter to sequentially transmit light beams of the second plurality of light beams according to second transmission times, and wherein the controller is configured to synchronize the first transmission times and the second transmission times with the scanning pattern.

Aspect 18: The image projection system of any of Aspects 12-17, wherein the single scanning structure is a microelectromechanical system (MEMS) mirror shared by the first relay optics system and the second relay optics system.

Aspect 19: The image projection system of any of Aspects 12-18, wherein: the image projection system is wearable headgear, the first relay optics system is configured to project the first stereoscopic image into a right eye of a user of the wearable headgear, and the second relay optics system is configured to project the second stereoscopic image into a left eye of the user.

Aspect 20: A binocular method of simultaneously projecting a first stereoscopic image into a first eye of a user of an image projection system and a second stereoscopic image into a second eye of the user, the method comprising: transmitting, by a first light transmitter of the image projection system, a first plurality of light beams on a first transmission path, wherein the first plurality of light beams correspond to the first stereoscopic image; transmitting, by a second light transmitter of the image projection system, a second plurality of light beams on a second transmission path, wherein the second plurality of light beams correspond to the second stereoscopic image; steering, by a single scanning structure of the image projection system, the first plurality of light beams according to a scanning pattern, wherein the single scanning structure is shared by the first transmission path and the second transmission path; steering, by the single scanning structure, the second plurality of light beams according to the scanning pattern; projecting, by a first relay optics system of the image projection system, the first plurality of light beams, while being steered according to the scanning pattern, into the first eye; and projecting, by a second relay optics system of the image projection system, the second plurality of light beams, while being steered according to the scanning pattern, into the second eye.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPLAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software executing on hardware, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An image projection system, comprising:
   eyeglasses comprising a frame, a first eyeglass lens, and a second eyeglass lens; and a binocular light engine coupled to the frame, wherein the binocular light engine comprises:
- a first light transmitter configured to generate and transmit a first plurality of light beams on a first transmission path, wherein the first plurality of light beams corresponds to a first stereoscopic image;
- a second light transmitter configured to generate and transmit a second plurality of light beams on a second transmission path, wherein the second plurality of light beams corresponds to a second stereoscopic image; and
- a single scanning structure shared by the first transmission path and the second transmission path, wherein the single scanning structure is configured to:
  - rotate about a first scanning axis for steering the first plurality of light beams and the second plurality of light beams in a first scanning direction,
  - rotate about a second scanning axis for steering the first plurality of light beams and the second plurality of light beams in a second scanning direction,
  - direct the first plurality of light beams at the first eyeglass lens according to a scanning pattern, and
  - direct the second plurality of light beams at the second eyeglass lens according to the scanning pattern,
- wherein the first eyeglass lens is configured to receive the first plurality of light beams from the single scanning structure and project the first stereoscopic image into a first field of view based on the first plurality of light beams and the scanning pattern, and
- wherein the second eyeglass lens is configured to receive the second plurality of light beams from the single scanning structure and project the second stereoscopic image into a second field of view based on the second plurality of light beams and the scanning pattern.

2. The image projection system of claim 1, wherein the single scanning structure is a microelectromechanical system (MEMS) mirror.

3. The image projection system of claim 1, wherein the first light transmitter is a first red-green-blue (RGB) light transmitter and the second light transmitter is a second RGB light transmitter.

4. The image projection system of claim 1, wherein:
- the first light transmitter is configured to sequentially transmit light beams of the first plurality of light beams according to first transmission times,
- the second light transmitter is configured to sequentially transmit light beams of the second plurality of light beams according to second transmission times, and
- the first transmission times are synchronized with the second transmission times.

5. The image projection system of claim 4, further comprising:
- a controller configured to synchronize the first transmission times and the second transmission times with the scanning pattern.

6. The image projection system of claim 1, further comprising:
- a first light driver configured to receive first stereoscopic image data and drive the first light transmitter according to the first stereoscopic image data to generate the first stereoscopic image; and
- a second light driver configured to receive second stereoscopic image data and drive the second light transmitter according to the second stereoscopic image data to generate the second stereoscopic image.

7. The image projection system of claim 6, further comprising:
- a controller configured to receive stereo video content, obtain the first stereoscopic image data and the second stereoscopic image data from the stereo video content, provide the first stereoscopic image data to the first light driver, and provide the second stereoscopic image data to the second light driver.

8. The image projection system of claim 6, further comprising:
- a controller configured to control the first light driver, the second light driver, and the scanning pattern of the single scanning structure,
- wherein the first light driver is configured to drive the first light transmitter to sequentially transmit light beams of the first plurality of light beams according to first transmission times,
- wherein the second light driver is configured to drive the second light transmitter to sequentially transmit light beams of the second plurality of light beams according to second transmission times, and
- wherein the controller is configured to synchronize the first transmission times and the second transmission times with the scanning pattern.

9. The image projection system of claim 8, wherein the binocular light engine comprises the controller, the first light driver, and the second light driver.

10. The image projection system of claim 1, the binocular light engine is integrated with a nose bridge of the frame.

11. The image projection system of claim 1, wherein the scanning pattern is a Lissajous scanning pattern or a raster scanning pattern.

12. An image projection system, comprising:
- a first relay optics system configured to generate a first stereoscopic image in a first field of view;
- a second relay optics system configured to generate a second stereoscopic image in a second field of view; and
- a binocular light engine comprising:
  - a first light transmitter configured to generate and transmit a first plurality of light beams on a first transmission path, wherein the first plurality of light beams correspond to the first stereoscopic image;
  - a second light transmitter configured to generate and transmit a second plurality of light beams on a second transmission path, wherein the second plurality of light beams correspond to the second stereoscopic image; and
  - a single scanning structure shared by the first transmission path and the second transmission path, wherein the single scanning structure is configured to:
    - rotate about a first scanning axis for steering the first plurality of light beams and the second plurality of light beams in a first scanning direction,
    - rotate about a second scanning axis for steering the first plurality of light beams and the second plurality of light beams in a second scanning direction,
    - direct the first plurality of light beams at the first relay optics system according to a scanning pattern, and
    - direct the second plurality of light beams at the second relay optics system according to the scanning pattern,
- wherein the first relay optics system is configured to receive the first plurality of light beams from the single scanning structure and project the first plurality of light beams into the first field of view based on the scanning pattern to generate the first stereoscopic image in the first field of view, and wherein the second relay optics system is configured to receive the second plurality of light beams from the single scanning structure and project the second plurality of light beams into the second field of view based on the scanning pattern to generate the second stereoscopic image in the second field of view.

13. The image projection system of claim 12, wherein a projection of the first stereoscopic image into the first field of view is synchronized with a projection of the second stereoscopic image into the second field of view.

14. The image projection system of claim 12, wherein:

the first light transmitter is a first red-green-blue (RGB) light transmitter configured to generate the first plurality of light beams according to a first plurality of pixel colors to produce the first stereoscopic image, and the second light transmitter is a second RGB light transmitter configured to generate the second plurality of light beams according to a second plurality of pixel colors to produce the second stereoscopic image.

15. The image projection system of claim 12, wherein:

the first light transmitter is configured to sequentially transmit light beams of the first plurality of light beams according to first transmission times, the second light transmitter is configured to sequentially transmit light beams of the second plurality of light beams according to second transmission times, and the first transmission times are synchronized with the second transmission times.

16. The image projection system of claim 12, further comprising:

a first light driver configured to receive first stereoscopic image data and drive the first light transmitter according to the first stereoscopic image data to generate the first stereoscopic image; and a second light driver configured to receive second stereoscopic image data and drive the second light transmitter according to the second stereoscopic image data to generate the second stereoscopic image.

17. The image projection system of claim 16, further comprising:

a controller configured to control the first light driver, the second light driver, and the scanning pattern of the single scanning structure, wherein the first light driver is configured to drive the first light transmitter to sequentially transmit light beams of the first plurality of light beams according to first transmission times, wherein the second light driver is configured to drive the second light transmitter to sequentially transmit light beams of the second plurality of light beams according to second transmission times, and wherein the controller is configured to synchronize the first transmission times and the second transmission times with the scanning pattern.

18. The image projection system of claim 12, wherein the single scanning structure is a microelectromechanical system (MEMS) mirror shared by the first relay optics system and the second relay optics system.

19. The image projection system of claim 12, wherein:

the image projection system is wearable headgear, the first relay optics system is configured to project the first stereoscopic image into a right eye of a user of the wearable headgear, and the second relay optics system is configured to project the second stereoscopic image into a left eye of the user.

20. A binocular method of simultaneously projecting a first stereoscopic image into a first eye of a user of an image projection system and a second stereoscopic image into a second eye of the user, the method comprising:

transmitting, by a first light transmitter of the image projection system, a first plurality of light beams on a first transmission path, wherein the first plurality of light beams correspond to the first stereoscopic image;

transmitting, by a second light transmitter of the image projection system, a second plurality of light beams on a second transmission path, wherein the second plurality of light beams correspond to the second stereoscopic image;

steering, by a single scanning structure of the image projection system, the first plurality of light beams according to a scanning pattern, wherein the single scanning structure is shared by the first transmission path and the second transmission path;

steering, by the single scanning structure, the second plurality of light beams according to the scanning pattern;

projecting, by a first relay optics system of the image projection system, the first plurality of light beams, while being steered according to the scanning pattern, into the first eye; and projecting, by a second relay optics system of the image projection system, the second plurality of light beams, while being steered according to the scanning pattern, into the second eye.

* * * * *